(12) United States Patent
Fluegge et al.

(10) Patent No.: US 12,523,249 B2
(45) Date of Patent: Jan. 13, 2026

(54) SLIDING COMPONENT, ASSEMBLY, AND METHOD OF FORMING AND USING THE SAME

(71) Applicant: SAINT-GOBAIN PERFORMANCE PLASTICS PAMPUS GMBH, Willich (DE)

(72) Inventors: Jan Fluegge, Cologne (DE); André Gabener, Essen (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 167 days.

(21) Appl. No.: 18/148,570

(22) Filed: Dec. 30, 2022

(65) Prior Publication Data

US 2023/0213057 A1     Jul. 6, 2023

Related U.S. Application Data

(60) Provisional application No. 63/266,236, filed on Dec. 30, 2021.

(51) Int. Cl.
*F16C 11/04*   (2006.01)
*F16C 27/02*   (2006.01)
*E05D 3/02*    (2006.01)
*E05D 11/00*   (2006.01)

(52) U.S. Cl.
CPC .............. *F16C 11/04* (2013.01); *F16C 27/02* (2013.01); *E05D 3/02* (2013.01); *E05D 11/00* (2013.01); *E05Y 2201/632* (2013.01)

(58) Field of Classification Search
CPC ........ F16C 27/02; F16C 27/04; F16C 27/045; F16C 17/02
See application file for complete search history.

(56) References Cited

U.S. PATENT DOCUMENTS

| 4,286,894 | A | 9/1981 | Rongley |
| 7,580,225 | B2 | 8/2009 | Hanrahan et al. |
| 7,611,303 | B2 | 11/2009 | Hanrahan et al. |
| 8,363,359 | B2 | 1/2013 | Slayne et al. |
| 9,022,683 | B2 | 5/2015 | Nias et al. |
| 9,028,165 | B2 | 5/2015 | Nias et al. |
| 9,074,637 | B2 | 7/2015 | Slayne et al. |
| 9,145,925 | B2 | 9/2015 | Nakamura et al. |
| 9,224,409 | B2 | 12/2015 | Nias et al. |
| 10,094,426 | B2 * | 10/2018 | Slayne ................. F16D 1/0835 |

(Continued)

FOREIGN PATENT DOCUMENTS

WO     2010029429 A1     3/2010

OTHER PUBLICATIONS

International Search Report and Written Opinion for PCT Application No. PCT/EP2022/088089, mailed Mar. 30, 2023, 15 pages.

*Primary Examiner* — James Pilkington
*Assistant Examiner* — Aimee Tran Nguyen
(74) *Attorney, Agent, or Firm* — Abel Schillinger, LLP; Ann Palma

(57) ABSTRACT

A sliding component including a sidewall including at least one low stiffness projection capable of elastic deformation, and at least one high stiffness projection capable of plastic deformation, where the low stiffness projection includes a radial face at an innermost or outermost surface adapted to contact a neighboring component.

20 Claims, 5 Drawing Sheets

(56) References Cited

U.S. PATENT DOCUMENTS

| | | | |
|---|---|---|---|
| 2006/0275076 A1* | 12/2006 | Hanrahan | F16D 1/0835 |
| | | | 403/365 |
| 2008/0247815 A1 | 10/2008 | Slayne et al. | |
| 2008/0267693 A1* | 10/2008 | Court | G11B 5/4813 |
| | | | 403/14 |
| 2012/0087044 A1 | 4/2012 | Schmidt et al. | |
| 2014/0193190 A1 | 7/2014 | Schmidt et al. | |
| 2017/0219018 A1 | 8/2017 | Kurachi | |
| 2018/0306248 A1 | 10/2018 | Itta et al. | |

* cited by examiner

SLIDING COMPONENT, ASSEMBLY, AND METHOD OF FORMING AND USING THE SAME

CROSS-REFERENCE TO RELATED APPLICATION(S)

This application claims priority under 35 U.S.C. § 119(e) to U.S. Provisional Application No. 63/266,236, entitled "SLIDING COMPONENT, ASSEMBLY, AND METHOD OF FORMING AND USING THE SAME," by Jan FLUEGGE et al., filed Dec. 30, 2021, which is assigned to the current assignee hereof and incorporated herein by reference in its entirety.

FIELD OF THE DISCLOSURE

The invention generally relates to sliding components that are located between moving parts in assemblies and, in particular, to an improved method and assembly employing a sliding component.

BACKGROUND

Sliding components facilitate movement within sliding assemblies involving relatively moving parts, such as inner components including, but not limited to, shafts, and outer components, including, but not limited to, housings. The shaft may rotate or translate within a bore created within the housing. One type of sliding component is a band located in a gap between the outer surface of the shaft and the inner surface of the bore. This sliding component facilitates axial and rotational movement. Sliding components may also be used in sliding assemblies, but not limited to, hinge assemblies for vehicles.

In conventional sliding component configurations, a close fit between the inner and outer components is sought. A close fit between the components is desirable because it reduces relative vibration between the parts. These requirements between the inner and outer components require strong and substantial contact, which increases frictional forces. Therefore, improved components for providing minimal variation in sliding forces and torques are sought. Further, reduced assembly forces, costs, and assembly time are desired with weight reductions in components within the assemblies. Consequently, improvements in sliding components and assemblies involving them continue to be of interest.

SUMMARY

A sliding component including: a sidewall including at least one low stiffness projection capable of elastic deformation, and at least one high stiffness projection capable of plastic deformation, where the low stiffness projection includes a radial face at an innermost or outermost surface adapted to contact a neighboring component.

An assembly, including: an outer component including a bore within the outer component; an inner component disposed within the bore; and a sliding component mounted between the inner component and the outer component, the sliding component including: a sidewall including at least one low stiffness projection capable of elastic deformation, and at least one high stiffness projection capable of plastic deformation, where the low stiffness projection includes a radial face at an innermost or outermost surface contacting at least one of the outer component or the inner component.

A method, including: providing an inner component and an outer component; positioning a sliding component between the inner component and the outer component, the sliding component including: a sidewall including at least one low stiffness projection including a radial face at an innermost or outermost surface and capable of elastic deformation, and at least one high stiffness projection capable of plastic deformation; and contacting the radial face of the low stiffness projection to at least one of the inner component or the outer component.

BRIEF DESCRIPTION OF THE DRAWINGS

So that the manner in which the features and advantages are attained and can be understood in more detail, a more thorough description may be had by reference to the embodiments that are illustrated in the appended drawings. However, the drawings illustrate only some embodiments and therefore are not to be considered limiting of the scope.

The use of the same reference symbols in different drawings indicates similar or identical items.

DETAILED DESCRIPTION OF THE INVENTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sliding component assembly and sliding component arts.

Figure 1A:
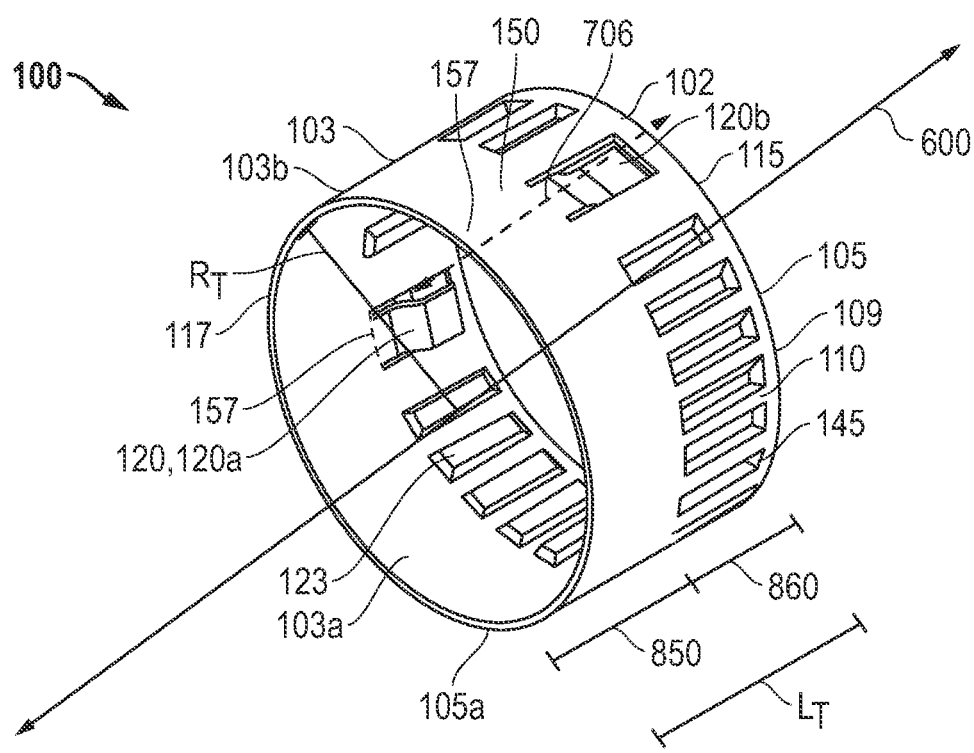
FIG. 1A depicts a top perspective view of a sliding component according to a number of embodiments.

FIG. 1A depicts a top perspective view of a sliding component 100 according to a number of embodiments. In an embodiment, the sliding component 100 may include a composite material 102 that may be curved into a ring-like (substantially annular) shape about a central axis 600. The sliding component 100 may include a sidewall 103. The sliding component 100 or sidewall 103 may have a first axial end 115 and a second axial end 117. In an embodiment, the sliding component 100 or sidewall 103 may include an interior sidewall 103a and an exterior sidewall 103b. The sidewall 103 may have an axial edge 105. In a number of embodiments, the sidewall 103 may have a first axial edge 105a and a second axial edge 105b. In an embodiment, the circumferential ends of the sidewall 103 may not meet (e.g., it may be formed as a split ring), thereby leaving an axial gap 106 adjacent the circumference of the sidewall 103. In other embodiments, the sidewall 103 may be curved so that the ends overlap with one another. In yet further embodiments, the sidewall 103 may be a continuous, unbroken ring. In an embodiment, the interior sidewall 103a may include an inner surface. In an embodiment, the exterior sidewall 103b may include an outer surface.

Figure 1B:
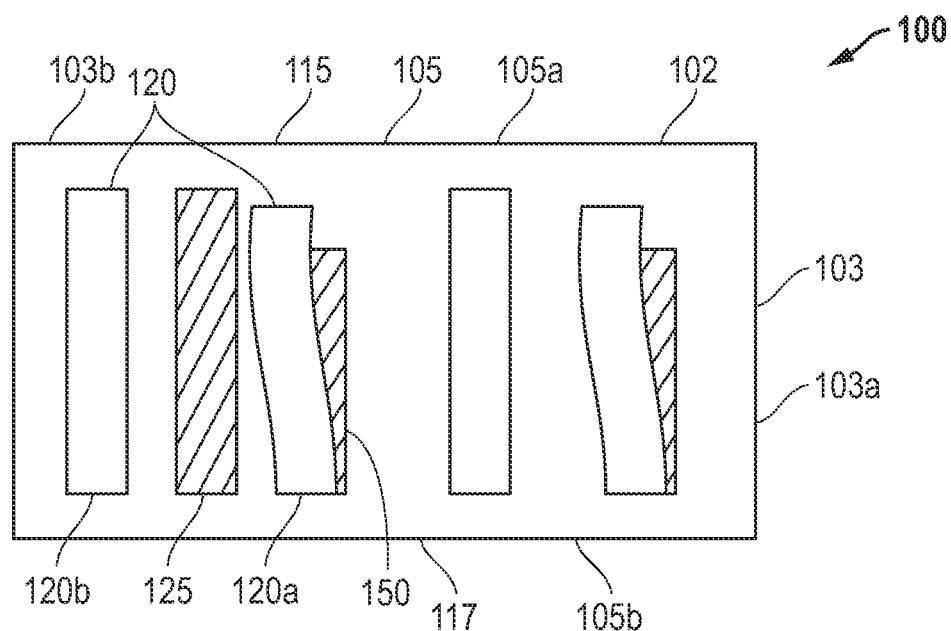
FIG. 1B depicts a top view of a sliding component according to a number of embodiments.

FIG. 1B depicts a top view of a sliding component 100 according to a number of embodiments. In an embodiment, the sliding component 100 may include a composite material 102 that may be a planar panel. The sliding component 100 may include a sidewall 103. The sliding component 100 or sidewall 103 may have a first axial end 115 and a second axial end 117. In an embodiment, the sliding component 100 or sidewall 103 may include an interior sidewall 103a and an exterior sidewall 103b. The sidewall 103 may have an axial edge 105. In a number of embodiments, the sidewall 103 may have a first axial edge 105a and a second axial edge 105b. In an embodiment, the interior sidewall 103a may include an inner surface. In an embodiment, the exterior sidewall 103b may include an outer surface.

Figure 2:
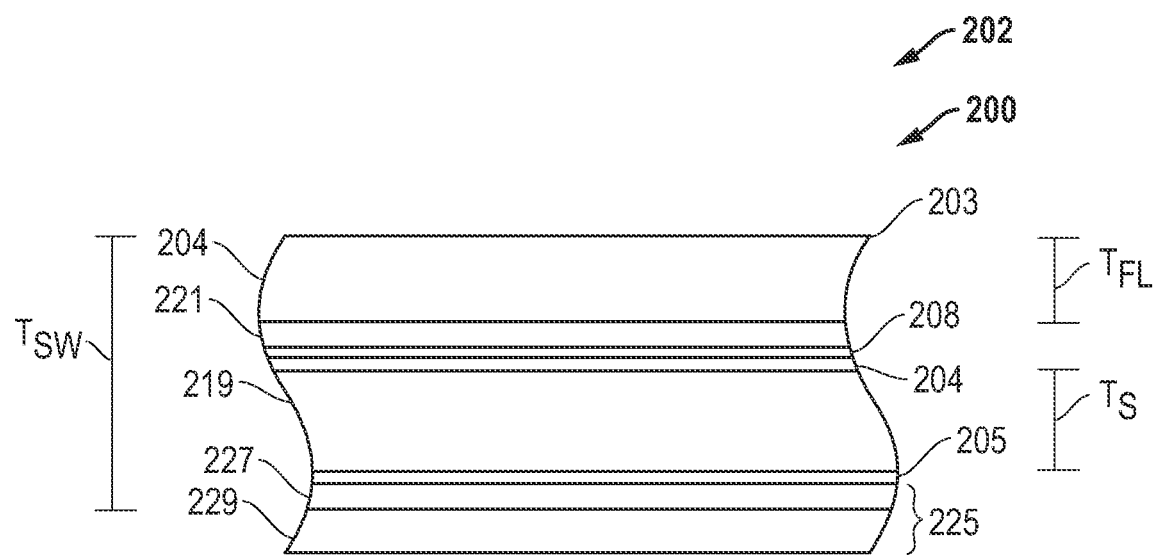
FIG. 2 depicts a side cross-sectional view of a composite material that may form a sliding component according to a number of embodiments.

FIG. 2 depicts a side cross-sectional view of a composite material 202 that may form a sliding component 200 according to a number of embodiments. In an embodiment, the sliding component 100 can include any material commonly used in the sliding component 100 arts. The sliding component 100 can comprise any suitable material with sufficient rigidity to withstand axial and longitudinal forces. In a particular embodiment, the sliding component 100 can comprise an injection molded polymer. In another embodiment, the sliding component 100 can comprise a metal or alloy (such as, but not limited to, aluminum, zinc, copper, magnesium, tin, platinum, titanium, tungsten, lead, iron, bronze, steel, spring steel, stainless steel) formed through a machining process. In yet another embodiment, the sliding component 100 can comprise a ceramic or any other suitable material. The sliding component 100 can be formed from a single piece, two pieces, or several pieces joined together by welding, adhesive, fasteners, threading, or any other suitable fastening means.

In an embodiment, as shown in FIG. 2, the sliding component 200 can include a composite material 202. For example, the sliding component 200 can include a substrate 219 and a sliding layer 204. The sliding layer 204 can be coupled to at least a portion of the substrate 219. In a further embodiment, the sliding layer 204 can be coupled to an entire major surface of the sidewall e.g., the radially inner or radially outer surface of the sidewall. In a particular embodiment, the sliding layer 204 can be coupled to the radially inner surface of the substrate 219 so as to form a low friction interface with at least one of an inner component 506 or outer component 502.

In an embodiment, the substrate 219 can at least partially include a metal. The metal may include aluminum, zinc, copper, magnesium, tin, platinum, titanium, tungsten, lead, iron, bronze, alloys thereof, or may be another type. More particularly, the substrate can at least partially include a steel, such as a stainless steel or spring steel. For example, the substrate can at least partially include a 301 stainless steel. The 301 stainless steel may be annealed, ¼ chard, ½ hard, ¾ hard, or full hard. The substrate 219 may include a woven mesh or an expanded metal grid (e.g. stretch metal). In an alternate embodiment, the substrate 219 may not include a mesh or grid.

In an embodiment, the sliding layer 204 can include comprise materials including, for example, a polymer, such as a polyketone, a polyaramid, a polyimide, a polytherimide, a polyphenylene sulfide, a polyetherslfone, a polysulfone, a polypheylene sulfone, a polyamideimide, ultra high molecular weight polyethylene, a fluoropolymer, a polyamide, a polybenzimidazole, or any combination thereof. The sliding layer 204 may include a low friction material. In an example, the sliding layer 204 includes a polyketone, a polyaramid, a polyimide, a polyetherimide, a polyamideimide, a polyphenylene sulfide, a polyphenylene sulfone, a fluoropolymer, a polybenzimidazole, a derivative thereof, or a combination thereof. In a particular example, the sliding layer includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the sliding layer includes polyketone, such as polyether ether ketone (PEEK), polyether ketone, polyether ketone, polyether ketone ether ketone, a derivative thereof, or a combination thereof. In an additional example, the sliding layer may be an ultra high molecular weight polyethylene. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), aromatic polyester, or any combination thereof. Fluoropolymers may be used according to particular embodiments.

In an embodiment, the sliding layer 204 may further include fillers, including glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and barium sulfate, or any combination thereof. Fillers can be in the form of beads, fibers, powder, mesh, or any combination thereof.

Optionally, the sliding component 200 may include at least one adhesive layer 221 that may include any known adhesive material common to the sliding component arts including, but not limited to, fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. In another alternate embodiment, the substrate 219, as a solid component, woven mesh or expanded metal grid, may be embedded between at least one adhesive layer 221 included between the friction material 204 and the substrate 219.

Optionally, the substrate 219 may be coated with temporary corrosion protection layers 204 and 205 to prevent corrosion of the load bearing substrate prior to processing. Additionally, a temporary corrosion protection layer 208 can be applied over layer 204. Each of layers 204, 205, and 208 can have a thickness of about 1 to 50 microns, such as about 7 to 15 microns. Layers 204 and 205 can include a phosphate of zinc, iron, manganese, or any combination thereof, or a nano-ceramic layer. Further, layers 704 and 705 can include aluminum, a phosphate of zinc, iron, manganese, or any combination thereof, a nano-ceramic layer, functional silanes, nano-scaled silane-based primers, hydrolyzed silanes, organosilane adhesion promoters, solvent/water-based silane primers, chlorinated polyolefins, passivated surfaces, commercially available zinc (mechanical/galvanic) or zinc-nickel coatings, or any combination thereof. Layer 208 can include functional silanes, nano-scaled silane-based primers, hydrolyzed silanes, organosilane adhesion promoters, solvent/water-based silane primers. Temporary corrosion protection layers 204, 206, and 208 can be removed or retained during processing.

Optionally, the sliding component 200 may further include a corrosion resistant coating 225. The corrosion resistant coating 225 can have a thickness of about 1 to 50 microns, such as about 5 to 20 microns, and such as about 7 to 15 microns. The corrosion resistant coating can include a corrosion protection layer 227 and an epoxy sealing layer 229. The corrosion protection layer 227 can include a phosphate of zinc, iron, manganese, tin, or any combination thereof, or a nano-ceramic layer. The corrosion protection layer 227 can include aluminum, a phosphate of zinc, iron, manganese, or any combination thereof, a nano-ceramic layer, functional silanes, nano-scaled silane-based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy sealing layer 229 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin layer 229 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_X H_Y X_Z A_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

In an embodiment, the sidewall 203 can have a thickness $T_{SW}$ in a range of 0.1 mm and 25 mm. In a more particular embodiment, the sidewall 203 can have a thickness $T_{SW}$ in a range of 0.1 mm and 1 mm, in a range of 0.2 mm and 1 mm, in a range of 0.25 mm and 1 mm, in a range of 0.3 mm and 1 mm, in a range of 0.35 mm and 1 mm, in a range of 0.4 mm and 1 mm, in a range of 0.45 mm and 1 mm, in a range of 0.5 mm and 1 mm, in a range of 0.55 mm and 1 mm, in a range of 0.6 mm and 1 mm, in a range of 0.65 mm and 1 mm, in a range of 0.7 mm and 1 mm, in a range of 0.75 mm and 1 mm, in a range of 0.8 mm and 1 mm, in a range of 0.85 mm and 1 mm, in a range of 0.9 mm and 1 mm, or even in a range of 0.95 mm and 1 mm. In another embodiment, the thickness $T_{SW}$ can be in a range of 0.2 mm and 0.95 mm, such as in a range of 0.2 mm and 0.9 mm, in a range of 0.2 mm and 0.85 mm, in a range of 0.2 mm and 0.8 mm, in a range of 0.2 mm and 0.75 mm, in a range of 0.2 mm and 0.7 mm, in a range of 0.2 mm and 0.65 mm, in a range of 0.2 mm and 0.6 mm, in a range of 0.2 mm and 0.55 mm, in a range of 0.2 mm and 0.5 mm, in a range of 0.2 mm and 0.45 mm, in a range of 0.2 mm and 0.4 mm, in a range of 0.2 mm and 0.35 mm, in a range of 0.2 mm and 0.3 mm, or even in a range of 0.2 mm and 0.25 mm. In a more particular embodiment, the sidewall 103 can have a thickness $T_{SW}$ between 0.35 mm and 0.65 mm. It will be further appreciated that the thickness $T_{SW}$ may be any value between any of the minimum and maximum values noted above. The thickness $T_{SW}$ may be uniform, i.e., a thickness at a first location of the sidewall 103 can be equal to a thickness at a second location therealong. The thickness of thickness $T_{SW}$ may be non-uniform, i.e., a thickness at a first location of the sidewall 103 can be different from a thickness at a second location therealong.

In an embodiment, the substrate 219 can have a thickness $T_S$ of between about 10 microns to about 1500 microns, such as between about 50 microns and about 1000 microns, such as between about 100 microns and about 750 microns, such as between about 350 microns and about 650 microns. In a number of embodiments, the substrate 219 may have a thickness $T_S$ of between about 700 and 800 microns. In a number of embodiments, the substrate 219 may have a thickness $T_S$ of between about 950 and 1050 microns. It will be further appreciated that the thickness $T_S$ of the substrate 219 may be any value between any of the minimum and maximum values noted above. The thickness of the substrate 219 may be uniform, i.e., a thickness at a first location of the substrate 219 can be equal to a thickness at a second location therealong. The thickness of the substrate 219 may be non-uniform, i.e., a thickness at a first location of the substrate 219 can be different from a thickness at a second location therealong.

In an embodiment, the sliding layer 204 can have a thickness $T_{SL}$ of between about 1 micron to about 500 microns, such as between about 10 microns and about 350 microns, such as between about 30 microns and about 300 microns, such as between about 40 microns and about 250 microns. In a number of embodiments, the sliding layer 204 may have a thickness $T_{SL}$ of between about 50 and 300 microns. It will be further appreciated that the thickness $T_{SL}$ of the sliding layer 204 may be any value between any of the minimum and maximum values noted above. The thickness of the sliding layer 204 may be uniform, i.e., a thickness at a first location of the sliding layer 204 can be equal to a thickness at a second location therealong. The thickness of the sliding layer 204 may be non-uniform, i.e., a thickness at a first location of the sliding layer 204 can be different from a thickness at a second location therealong. It can be appreciated that different sliding layer 204 may have different thicknesses. The sliding layer 204 may overlie one major surface of the substrate 219, shown, or overlie both major surfaces. The substrate 219 may be at least partially encapsulated by the sliding layer 204. That is, the sliding layer 204 may cover at least a portion of the substrate 219. In a number of embodiments, the sliding layer 204 may encapsulate the substrate 219 such that at least one of the radial inner and outer surfaces of the substrate 219 may be located within the sliding layer 219. Axial surfaces of the substrate 219 may be exposed from the sliding layer 204. The encapsulating step may be performed by calendaring or laminating through the apertures in the sheet. The sheet may be formed into a substrate 219 having radial inner and outer surfaces.

In some particular embodiments, the sliding component 200 may be formed from spring steel (e.g., cold rolled stainless steel) and may have a sliding layer 104 laminated thereto. For example, the stainless steel may be 0.1 to 0.7 mm thick, and the low friction may be in a range of about 0.05 to 0.50 mm thick (e.g., 0.25 mm) and bonded to the steel before the sliding component 200 may be formed into its circular or planar shape.

In an embodiment, the thickness of the sidewall 103 may be uniform, i.e., a thickness at a first location of the sidewall 103 can be equal to a thickness at a second location therealong. In another embodiment, the thickness of the sidewall 103 may vary, i.e., a thickness at a first location of the sidewall 103 may be different than a thickness at a second location therealong.

In an embodiment, referring to FIG. 1A, the sliding component 100 may have a radius $R_T$ of at least 1 mm, at least 5 mm, at least 10 mm, at least 15 mm, at least 20 mm, at least 30 mm, at least 40 mm. The radius $R_T$ may be no greater than 5 mm, no greater than 10 mm, no greater than 15 mm, no greater than 20 mm, no greater than 30 mm, no greater than 40 mm, or no greater than 50 mm. In an embodiment, the sliding component 100 can have an axial length, $L_T$, as measured between axial ends 115, 117, of no greater than 5 mm, no greater than 10 mm, no greater than 15 mm, no greater than 20 mm, no greater than 30 mm, no greater than 40 mm, or no greater than 50 mm. The sliding component 100 can have an axial length, $L_T$, as measured between axial ends 115, 117, of at least 5 mm, at least 10 mm, at least 15 mm, at least 20 mm, at least 30 mm, at least 40 mm, or at least 50 mm. The radius $R_T$ may vary along the axial length $L_T$.

Referring back to FIGS. 1A-1B, in a number of embodiments, at least one projection 120 may be at least partially coupled to the sliding component 100. In an embodiment, the projection 120 may be formed in the sliding component 100. The projection 120 can be monolithic with the sidewall 103, i.e., the projection 120 may have a unitary construction with the sidewall 103. In another particular embodiment, at least one of the projections 120 may comprise a separate component attached to the sidewall 103. For example, the separate component may be attached to the sidewall 103 by an adhesive, welding, crimping, or any other suitable process recognizable in the art. In an embodiment, the projection 120 may be located axially inward of an axial edge 115, 117 of the sidewall 103 of the sliding component 103. In an embodiment, at least one projection 120 can extend radially outward from the sidewall 103. In an embodiment, at least one projection 120 can extend radially inward from the sidewall 103. In still other embodiments at least one projection 120 may extend radially inward or outward depending on the particular situation.

In an embodiment, each projection 120 can define an aspect ratio as measured by a length thereof in the axial direction as compared to a width thereof, as measured in the circumferential direction. In an embodiment, at least one of the projections 120 can have an aspect ratio of at least 1.1:1, such as at least 1.5:1, at least 2:1, at least 3:1, at least 4:1, at least 5:1, or even at least 10:1. In an embodiment, the aspect ratio can be no greater than 100:1, such as no greater than 50:1, or even no greater than 25:1.

The projection 120 may be formed by a process, such as, for example, stamping, pressing, or cutting. In an embodiment, at least one of the projections 120 may be formed prior to formation of the sidewall 103, e.g., prior to rolling a flat sheet to form the sidewall 103. In an embodiment, at least one of the projections 120 may be formed after formation of the sidewall 103, e.g., after rolling a flat sheet to form the sidewall 103. In some embodiments, the sliding component 100 may be formed from a flat strip of resilient material (which forms the sidewall 103). Before the strip is bent into its curved shape, and before the projections 120 may be formed, the sliding layer may be laminated onto one surface thereof. In other embodiments, the sliding layer may be laminated onto both surfaces of the flat strip. After the sliding layer may be attached to the flat strip, the resulting layer structure may be stamped (e.g., pressed using a suitably shaped mold, rotary wave forming, etc.) to form the projections 120. Thus, at least one of the projections 120 may be formed from both the strip of resilient material and from the sliding layer. The material of the sliding layer may be chosen to be flexible to facilitate this stamping step. The sliding layer may be on the radial outside or the radial inside of the sidewall 103 at the interior sidewall 103a or the exterior sidewall 103b. That is, in an embodiment, the inner surface of the interior sidewall 103a may have a low friction layer 204 that conforms to the shape of the sidewall 103. In an embodiment, the outer surface of the exterior sidewall 103b may have a low friction layer 204 that conforms to the shape of the sidewall 103.

After the projections 120 may be formed, the layered structure may be curved into the ring-like configuration shown in FIG. 1A, or left planar as shown in FIG. 1B.

In an embodiment, at least two of the projections 120 have the same geometric shape or size as compared to each other. In a further embodiment, all of the projections 120 may have the same geometric shape or size as compared to each other. In another embodiment, at least two of the projections 120 may have different geometric shapes or sizes as compared to each other. In a further embodiment, all of the projections 120 may have different geometric shapes or sizes as compared to each other.

In an embodiment, the plurality of projections 120 can be spaced apart in a circumferential direction around the sidewall 103. In a more particular embodiment, each of the plurality of projections 120 may be spaced apart from one another an equal distance as measured around a circumference of the sidewall 103.

In an embodiment, the plurality of projections 120 can be disposed in at least two circumferentially extending rows. In a particular embodiment, the plurality of projections 120 may be disposed in at least 3 circumferentially extending rows, such as at least 4 circumferentially extending rows, at least 5 circumferentially extending rows, or even at least 6 circumferentially extending rows. In another embodiment, the plurality of projections 120 can be disposed in no greater than 25 circumferentially extending rows, such as no greater than 15 circumferentially extending rows, no greater than 10 circumferentially extending rows, or even no greater than 7 circumferentially extending rows.

In an embodiment, the projections 120 can extend from the sidewall 103 in different directions. In a more particular embodiment, the projections 120 can extend in opposite radial directions from the interior sidewall 103a and the exterior sidewall 103b. In a more particular embodiment, the projections 120 can extend in opposite directions.

In an embodiment, the projections 120 can each define an axial bisecting line. In an embodiment, the axial bisecting lines of at least two projections 120 can be oriented parallel, i.e., the at least two projections 120 may be oriented parallel to each other. In a more particular embodiment, all of the projections 120 can be oriented parallel with respect to each other.

In an embodiment, the projection 120 may have a radius of curvature as measured in a circumferential direction of the sliding component 100 that may be different than a radius of curvature of the sidewall 103. In a more particular embodiment, the projection 120 may have a larger radius of curvature as compared to the sidewall 103. In this regard, the projection 120 may appear more planar than the sidewall 103.

In an embodiment, an average thickness of at least one of the projection 120 can be approximately equal to the thickness of the sidewall 103. For example, the average thickness of the at least one projection 120 may be within 10% of the thickness of the sidewall 103. In another embodiment, the average thickness of at least one of the projection 120 may be different than the thickness of the sidewall 103, i.e., the average thickness of the projection 120 may be greater than 10% different than the thickness of the sidewall 103.

In an embodiment, an average thickness of at least one of the projection 120 can be approximately equal to the thickness of the sidewall 103. For example, the average thickness of the at least one projection 120 may be within 10% of the thickness of the sidewall 103. In another embodiment, the average thickness of at least one of the projection 120 may be different than the thickness of the sidewall 103, i.e., the average thickness of the projection 120 may be greater than 10% different than the thickness of the sidewall 103. In a number of embodiments, at least one projection 120 may have a Young's modulus of about 2 to about 250 GPa. The projection 120 may include the substrate 219, sliding layer 204 or any of the layers disclosed above.

Referring still to FIGS. 1A-1B, in number of embodiments, the sliding component 100 can include a plurality of projections 120 at least partially coupled to the sidewall 103. The plurality of projections 120 can include a first projection 120a and a second projection 120b. The first projection 120a may be a high stiffness projection defined as being capable of plastic deformation as described in detail below. The second projection 120b may be a low stiffness projection defined as being capable of elastic deformation as described in detail below. In an embodiment, at least two of the projections 120a, 120b may extend radially away from each other. In an embodiment, at least two of the projections 120a, 120b may extend the same radial direction. In an embodiment, at least two of the high stiffness projections and low stiffness projections may be ordered alternatively around the sidewall. In an embodiment, at least two of the high stiffness projections and low stiffness projections may be ordered concurrently around the sidewall.

In a number of embodiments, the at least one high stiffness projection 120a may be a wave projection. In an embodiment, at least one of the high stiffness projections 120b may extend radially outward from the outer surface of the sliding component 100. In an embodiment, at least one of the high stiffness projections 120b may extend radially inward from the outer surface of the sliding component 100. In an embodiment, the sidewall 103 may include a flat, circumferentially-extending rim 109 at each axial end of the high stiffness projections 120b. In a number of embodiments, a rim 109a, 109b may be present at each axial end 105, 107 of the sidewall 103 of the sliding component 100. In an embodiment, a high stiffness projection 120a may be separated from its neighboring high stiffness projection 120a by an unformed section 110 of the sliding component 100, which may be contiguously formed with rims 109. In a number of embodiments, the number of high stiffness projection 120a and unformed sections 110 may be varied depending on the application of the sliding component 100. In a particular embodiment, there may be no unformed section 110 between adjacent projections 120. In a more particular embodiment, as shown in FIG. 1B, a bore 150 may be formed between adjacent projections 120.

The high stiffness projections 120b may include axially-elongated arches or ridges 123 that may be similar in shape to waves used on conventional sliding components. The backside of the high stiffness projection 120a may show an indent 145 in the sidewall 103 of the sliding component 100. The peak of each ridge may be rounded, and the axial ends of each ridge may terminate at a tapered shoulder 111. In a number of embodiments, the high stiffness projections 120b may be disposed axially adjacent the bore 150 and/or the neighboring projection 120. In an embodiment, the high stiffness projections 120b may be disposed circumferentially adjacent the bore 150 and/or the neighboring projection 120. In an embodiment, the high stiffness projections 120b may be shoulderless.

In a number of embodiments, the sidewall 103 may further include cut-out portions which are bores or holes between neighboring projections. The cut-out portions 125 may have any cross-sectional shape including, but not limited to, circular, rectilinear, arcuate, polygonal, oval, semi-circular, oblong, or may be another type.

In a number of embodiments, the at least one low stiffness projection 120b may be a finger projection. In an embodiment, at least one of the finger projections 120b may extend radially outward from the outer surface of the sliding component 100. In an embodiment, at least one of the finger projections 120b may extend radially inward from the outer surface of the sliding component 100. Referring again to FIGS. 1A-1B, in an embodiment, at least one of the low stiffness projections 120a can be coupled to the sidewall 103 along a first side thereof (indicated at dashed line 157). In an embodiment, the at least one low stiffness projection 120b can be continuously disconnected from the sidewall 103 along the remaining sides. For example, the at least one low stiffness projection 120b can be continuously disconnected from an entire third side (opposite the first side 157) and at least a portion of opposite second and fourth sides (each extending between the first and third sides). This may form a bore 150 in the sidewall 103. As used herein, "continuously disconnected" refers to a single disconnection or gap between the at least one low stiffness projection 120b and the sidewall 103. In such a manner, the at least one low stiffness projection 120b can be attached to the sidewall 103 along only one side.

Figure 1C:
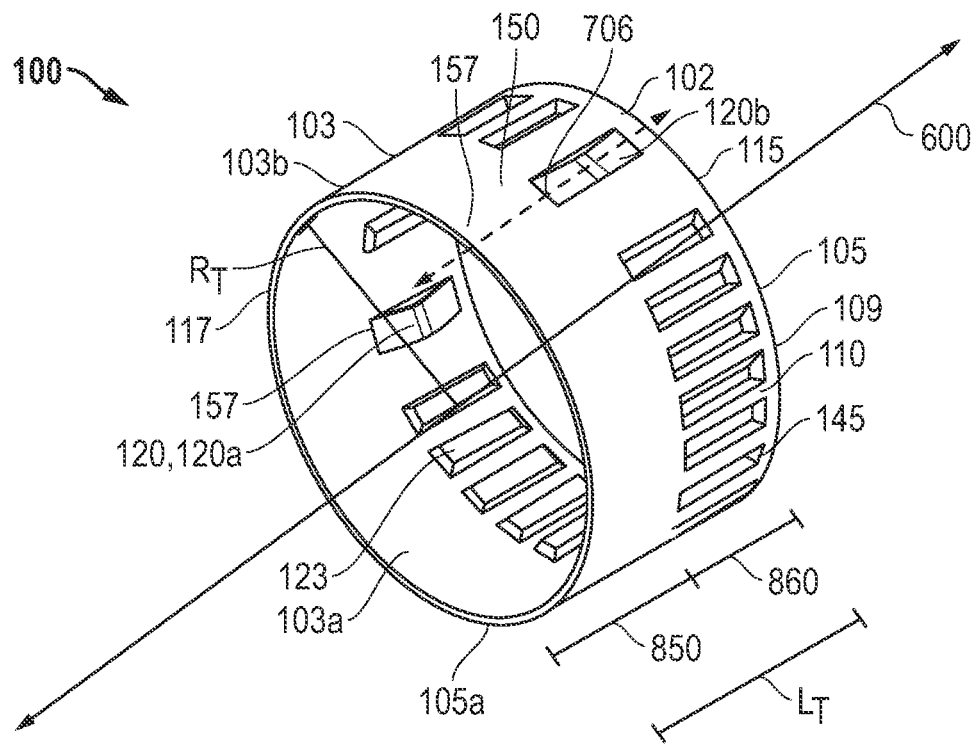
FIG. 1C depicts a top perspective view of a sliding component according to a number of embodiments.
Figure 1D:
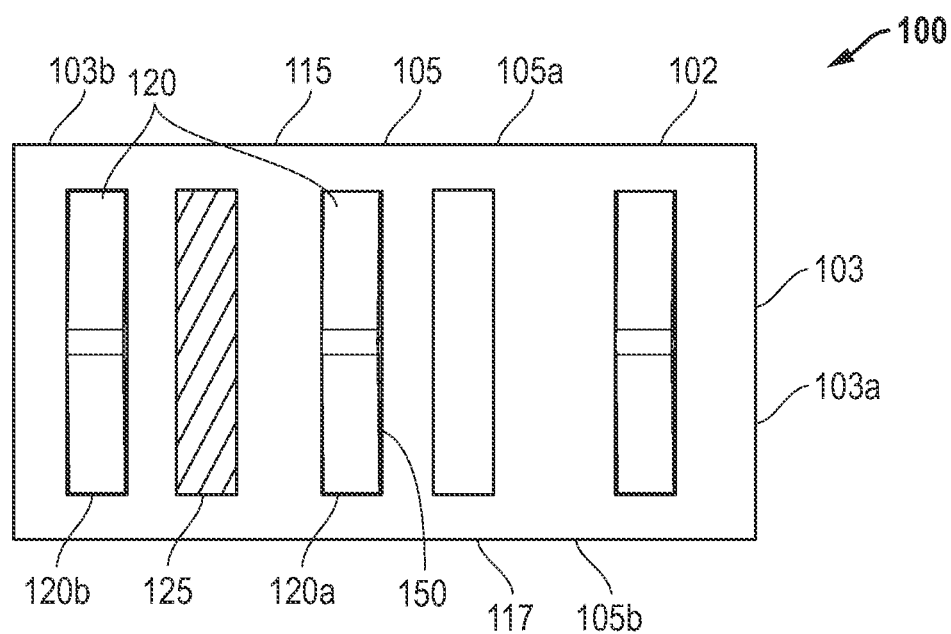
FIG. 1D depicts a top view of a sliding component according to a number of embodiments.
Figure 3:
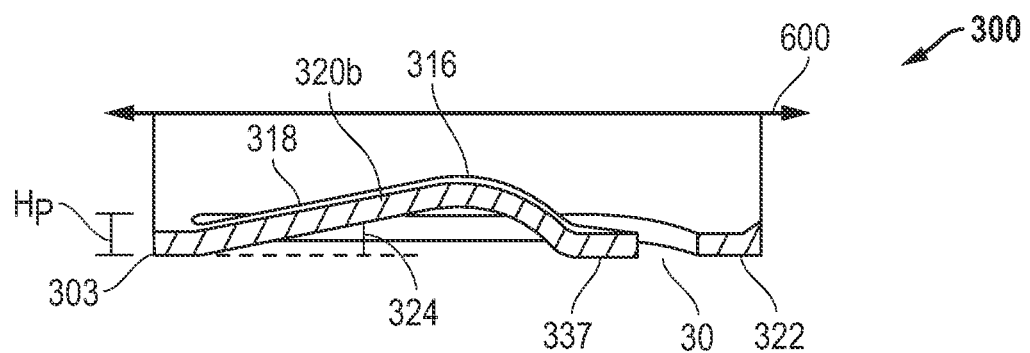
FIG. 3 depicts a side cross-sectional view of a low stiffness projection according to a number of embodiments.

Alternatively, FIG. 1C depicts a top perspective view of a sliding component 100 according to a number of embodiments and FIG. 1D depicts a top view of a sliding component 100 according to a number of embodiments. As shown in FIGS. 1C-1D the at least one low stiffness projection 120b may be a rib projection. In an embodiment, at least one of the rib projections 120b may extend radially outward from the outer surface of the sliding component 100. In an embodiment, at least one of the rib projections 120b may extend radially inward from the outer surface of the sliding component 100. Referring again to FIGS. 1A-1B, in an embodiment, at least one of the low stiffness projections 120a can be coupled to the sidewall 103 along a first side thereof (indicated at dashed line 157) and a third side (opposite the first side 157) and continuously disconnected from the sidewall 103 along at least a portion of opposite second and fourth sides (each extending between the first and third sides). This may form a bore 150 in the sidewall 103. As used herein, "continuously disconnected" refers to a single disconnection or gap between the at least one low stiffness projection 120b and the sidewall 103. FIG. 3 depicts a side cross-sectional view of a low stiffness projection according to a number of embodiments. In an embodiment, as shown in FIG. 3, at least one of the low stiffness projections 320b may have an arcuate profile. At least one of the low stiffness projections 320b may include at least one generally arcuate edge. In another embodiment, at least one of the low stiffness projections 320b may have a polygonal profile. In another embodiment, at least one of the low stiffness projections 320b may include at least one polygonal angle. For example, the projections 320b may include a triangle or a quadrilateral shape extending from the sidewall 303. In yet another embodiment, at least one of the low stiffness projections 320b may have an arcuate portion and a polygonal portion.

In an embodiment, as shown in FIG. 3, at least one of the low stiffness projections 320b can define a radially innermost surface 316 and a bridge portion 318 connecting the radially innermost surface 316 to the sidewall 303. In an embodiment, at least one of the low stiffness projections 320b may fill a portion of a bore 350 on a side of the sidewall 303 of the sliding component 300. A best fit line of the bridge portion 318 can cant relative to the central axis 600. The bridge portion 318 can form an angle 324 with respect to the sidewall 303, as measured in the unassembled or unloaded state. By way of a non-limiting embodiment, the angle 324 between the bridge portion 318 and the sidewall 303 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, at least one of the low stiffness projections 320b may have a radially innermost surface 316 which may have a diameter that is less than the diameter of the sidewall 303. In a number of embodiments, the projection radially innermost surface 316 may have a diameter $D_{IM}$ and the sidewall may have a diameter $D_S$ where $D_{IM} \leq D_S$, such as $D_{IM} \leq 0.95 D_S$, $D_{IM} \leq 0.9 D_S$, $D_{IM} \leq 0.85 D_S$, $D_{IM} \leq 0.8 D_S$, $D_{IM} \leq 0.75 D_S$, $D_{IM} \leq 0.7 D_S$, $D_{IM} \leq 0.65 D_S$, $D_{IM} \leq 0.6 D_S$, $D_{IM} \leq 0.55 D_S$, $D_{IM} \leq 0.5 D_S$, $D_{IM} \leq 0.4 D_S$, $D_{IM} \leq 0.2 D_S$, or $D_{IM} \leq 0.1 D_S$.

In a particular embodiment, at least one of the low stiffness projections 320b can further include an end portion 337 extending radially outward from the innermost surface 316. The end portion 337 can extend from the innermost surface 316 opposite the bridge portion 318. In an embodiment, the end portion 337 may extend toward the first axial end of the sliding component 300. In an embodiment, the end portion 337 may extend toward the second axial end of the sliding component 300. In an embodiment, a portion of the end portion 337 of the projection 320 can extend radially outward beyond an outer surface 322 of the generally sidewall 303. In another embodiment, an outer surface of the end portion 337 can lie along the same plane as the outer surface 322 of the sidewall 303. In yet a further embodiment, the outer surface of the end portion 337 can terminate radially inside of the outer surface 322 of the sidewall 303. Termination of the end portion 337 radially inside of the outer surface 322 may be particularly suitable when the sliding component 300 may be encased in an outer component that limits radially outward deflection of the end portion 337 beyond the outer surface 322.

Figure 4:
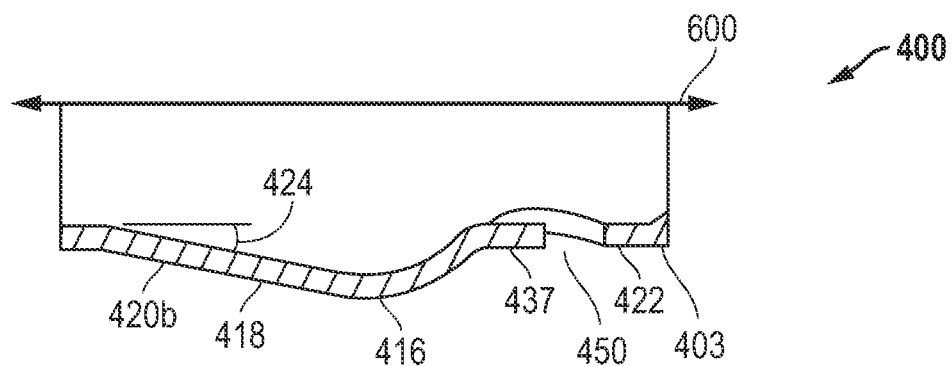
FIG. 4 depicts a side cross-sectional view of a low stiffness projection according to a number of embodiments.

FIG. 4 depicts a side cross-sectional view of a low stiffness projection according to a number of embodiments. In another embodiment, in an opposite orientation shown in FIG. 4, at least one of the low stiffness projections 420b can define a radially outermost surface 417 and a bridge portion 418 connecting the radially outermost surface 417 to the sidewall 403. A best fit line of the bridge portion 418 can cant relative to the central axis 600. The bridge portion 418 can form an angle 424 with respect to the sidewall 403, as measured in the unassembled or unloaded state. By way of a non-limiting embodiment, the angle 424 between the bridge portion 418 and the sidewall 403 in the unloaded state can be at least 2°, such as at least 3°, at least 4°, at least 5°, or even at least 10°. In another embodiment, the angle 724 can be no greater than 45°, such as no greater than 40°, no greater than 35°, no greater than 30°, no greater than 25°, or even no greater than 20°. In an embodiment, at least one of the low stiffness projections 420b may define a radially outermost surface 417 which may have a diameter that may be greater than the diameter of the sidewall 403. In a number of embodiments, the projection radially outermost surface 417 may have a diameter $D_{OM}$ and the sidewall may have a diameter $D_S$ where $D_S \leq D_{OM}$, such as $D_S \leq 0.95 D_{OM}$, $D_S \leq 0.9 D_{OM}$, $D_S \leq 0.85 D_{OM}$, $D_S \leq 0.8 D_{OM}$, $D_S \leq 0.75 D_{OM}$, $D_S \leq 0.7 D_{OM}$, $D_S \leq 0.65 D_{OM}$, $D_S \leq 0.6 D_{OM}$, $D_S \leq 0.55 D_{OM}$, $D_S \leq 0.5 D_{OM}$, $D_S \leq 0.4 D_{OM}$, $D_S \leq 0.2 D_{OM}$, or $D_S \leq 0.1 D_{OM}$.

In a particular embodiment, at least one of the low stiffness projections 420b can further include an end portion 437 extending radially outward from the innermost surface 416. The end portion 437 can extend from the innermost surface 416 opposite the bridge portion 418. In an embodiment, the end portion 437 may extend toward the first axial end of the sliding component 400. In an embodiment, the end portion 437 may extend toward the second axial end of the sliding component 400. In an embodiment, a portion of the end portion 437 of the projection 420 can extend radially outward beyond an outer surface 422 of the generally sidewall 403. In another embodiment, an outer surface of the end portion 437 can lie along the same plane as the outer surface 422 of the sidewall 403. In yet a further embodiment, the outer surface of the end portion 437 can terminate radially inside of the outer surface 422 of the sidewall 403.

Termination of the end portion 437 radially inside of the outer surface 422 may be particularly suitable when the sliding component 400 may be encased in an outer component that limits radially outward deflection of the end portion 437 beyond the outer surface 422.

In a number of embodiments, as shown in FIGS. 3-4, the projections 320, 420 (including at least one of the high stiffness projections or low stiffness projections) may have a radial height $H_P$ as measured from the radially innermost surface 316 or radially outermost surface 416 to the sidewall 303, 403. The projections 320, 420 may have a radial height $H_P$ of at least 0.5 mm, at least 0.10 mm, at least 0.15 mm, at least 0.20 mm, at least 0.30 mm, at least 0.40 mm. The projections 320, 420 may have a radial height $H_P$ that may be no greater than 0.5 mm, no greater than 0.10 mm, no greater than 0.15 mm, no greater than 0.20 mm, no greater than 0.30 mm, no greater than 0.40 mm. In an embodiment, different projections 320, 420 may have different radial heights. In an embodiment, different projections 320, 420 may have the same radial height.

Figure 5A:
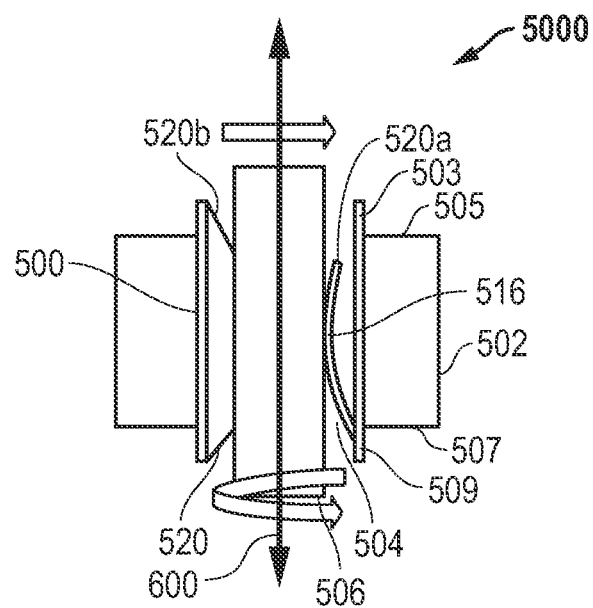
FIG. 5A depicts a side cross-sectional view of a sliding component within an assembly according to a number of embodiments.
Figure 5B:
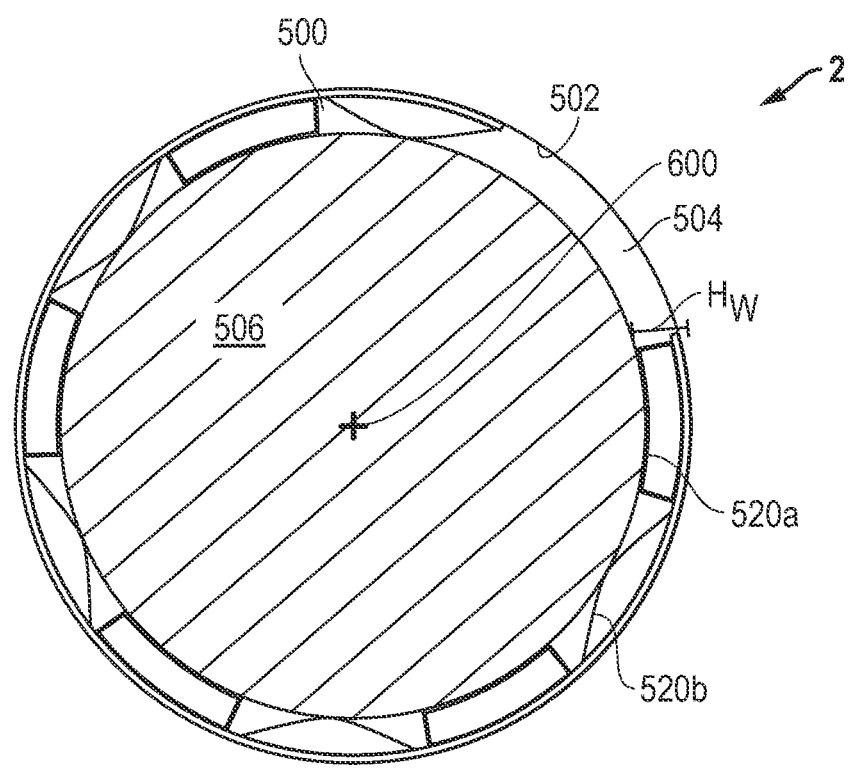
FIG. 5B depicts a top view of a sliding component within an assembly according to a number of embodiments.

FIG. 5A depicts a side cross-sectional view of a sliding component within an assembly according to a number of embodiments. FIG. 5B depicts a top view of a sliding component within an assembly according to a number of embodiments. As shown in FIGS. 5A-5B, the sliding component 500 may be placed between neighboring components to form an assembly 5000 down the central axis 600. In an embodiment, the sliding component 500 may be placed between an inner component 506 and the outer component 502. The outer component 502 may include a housing ("housing" and "outer component" used interchangeably herein). The housing 502 or outer component may have a first axial end 505 and a second axial end 507. The housing 502 may have an axial bore 504 formed therein, which receives a shaft 506 or inner component ("shaft" and "inner component" used interchangeably herein). As shown in FIGS. 5A-5B, the sliding component 500 may be located in the annular space between a shaft 506 and a bore 504 in a housing 502. The projections 520 may be compressed between the inner and outer components 506, 502. Each projection 520 may act as a spring and deforms to fit the components together with zero clearance therebetween. In other words, the inner component 506 contacts the inner surfaces of the sliding component 500 and the outer component 502 contacts the outer surfaces of the sliding component. Sliding components 500 may be used to provide sliding contact (e.g. axial, rotational) between the outer component 502 and the inner component 506. Sliding components 500 may be used to provide a frictional fit between the outer component 502 and the inner component 506. In a number of embodiments, the sliding component 500 may be fixed to at least one of the inner component 506 or the outer component 502 through form fitting, force fitting, or bonding (including, but not limited to, adhesive bonding). Optionally the assembly 5000 may include a fit ring that may be the sliding component 500.

Sliding components 500 may be used to transfer torque or as torque limiters in such assemblies 5000. The annular gap 504 may exist between an outer surface of shaft 506 and an inner surface of the housing 502. The size of this annular gap 504 may be variable because the diameter of the shaft 506 and housing 502 may vary within manufacturing tolerances. To prevent vibration of the shaft 506 within the housing 502, the annular gap 504 may be filled by sliding component 500 to form a zero-clearance fit between the components. In use, the circumferential projections 520 of the sliding component 500 may be radially compressed in the annular gap 504 between the shaft 506 and housing 502, such that the projections 520 contact the inner surface of the shaft 506. The slip interface may be formed where the sliding layer of the projection 520 contacts the outer surface of the shaft 506. The sliding component 500 may reduce the gap to zero so there may be no clearance between the components in assembly 5000. Alternatively, the circumferential projections 520 of the sliding component 500 may be radially compressed in the annular gap 504 between the shaft 506 and housing 502, such that the projections 520 contact the inner surface of the housing 502. The slip interface may be formed where the sliding layer of the projection 520 contacts the inner surface of the shaft 506. The sliding component 500 may reduce the gap to zero so there may be no clearance between the components in assembly 5000. Thus, slipping may be substantially limited to and occurs substantially freely at the slip interface between the sliding component 500 and at least one of the shaft 506 and the housing 502.

If forces (e.g., rotational or linear) are applied to one or both of the inner and outer components 506, 502 such that there may be a resultant force between the inner and outer components 506, 502, the inner and outer components 506, 502 can move relative to each other. Since some embodiments have zero clearance between the components 506, 502, there may be a pair of contacting surfaces that slide relative to each other. This may be the slip interface. In some embodiments, the slip interface occurs at the surfaces of contact between the sliding layer on the sliding component 500 and at least one of the inner component 506 or outer component 502. The surfaces of contact may include the inner surfaces of the flat rims 509 and the "footprints" of each high stiffness projection 120a or low stiffness projection 120b. The material for the sliding layer on the sliding component 500 and the configuration of the high stiffness projections 520a or low stiffness projections 520b provide a slip force at the slip interface that may be substantially lower than an expected value derived from the force provided. This low slip force facilitates motion between the moving contact surfaces. In contrast, at the surfaces of contact between at least one of the inner component 506 or the outer component 502 and the sidewall 503 surface without a sliding layer, there may be sufficient frictional force to retain the sliding component 400 in place relative to at least one of the inner component 506 or the outer component 502. In other embodiments, both surfaces of the sidewall 503 may be laminated with a sliding layer. Thus, there may be two slip interfaces in such embodiments.

The contact area between the surface of at least one of the inner component 506 or the outer component 502 and sliding layer of the sidewall 503 may be a slip interface at which relative motion between at least one of the inner component 506 or the outer component 502 and the sliding component 500 occurs. The sliding component 500 may be secured relative to the at least one of the inner component 506 or the outer component 502 by frictional engagement at the contact area between the sidewall 503 without sliding layer and the surface of at least one of the inner component 506 or the outer component 502. If, through use, wear of at least one of the inner component 506 or the outer component 502 or the sliding layer on the sliding component 500 occurs at the slip interface, the projections 520 may compensate by resiliently moving toward their rest state, thereby maintaining contact with at least one of the inner component 506 or the outer component 502.

In a number of embodiments, the sliding component 500 may be formed with projections 520 that may be designed to achieve spring characteristics as required for the particular force control application intended. The sliding layer may lower the sliding forces, reduces force variation, and provides a low friction slip surface that withstands many slips without wear on the underlying materials. This allows sliding components 500 to be designed to fulfill force control functions not possible within the usual envelope of performance achieved by variation of sliding component geometry alone, such as low slip torque, low sliding force, with little force degradation over many slip cycles. For example, a sliding component 500 in accordance with the invention reduces sliding force or torque to approximately one-half to one-third of what would be expected for an equivalent design, metal-only sliding component. In an embodiment, the sliding component 500 may provide a torque value of 0.1 Nmm to 50 Nm under a rotation angle of 0°-360°.

In this disclosure, slip torque may be defined as the torque at which two components that may be joined by a sliding component 500 begin to rotate with respect to each other due to any applied torque loading to the assembly 5000. The sliding component fixing 500 may hold the mating components together without relative rotation until this threshold value may be reached, at which point the frictional forces generated by compression of the sliding component projections 520 may be overcome and respective rotation may occur, resisted by the frictional forces. Similarly, axial sliding force may be the same thing, but in an axial direction. The sliding component 500 may only permit axial sliding between two components if the threshold force value may be exceeded. The threshold force may be generated by the frictional forces generated by compression of the sliding component waves. Overload protection force, or torque, occurs where the sliding component 500 slip torque or sliding force may be set to be below the safe capacity of the assembly 5000. The sliding component 500 permits slippage if the assembly 5000 receives an external load, above the threshold value, that may otherwise have caused damage to the assembly 5000.

In an embodiment, the housing 502 or outer component can include any material commonly used in the rotational assembly arts. The housing 502 or outer component can comprise any suitable material with sufficient rigidity to withstand axial and longitudinal forces. In a particular embodiment, the housing 502 or outer component can comprise an injection molded polymer. In another embodiment, the housing 502 or outer component can comprise a metal or alloy formed through a machining process. In yet another embodiment, the housing 502 or outer component can comprise a ceramic or any other suitable material. The housing 502 or outer component can be formed from a single piece, two pieces, or several pieces joined together by welding, adhesive, fasteners, threading, or any other suitable fastening means.

In an embodiment, the shaft 506 or inner component can include any material commonly used in the rotational assembly arts. The shaft 506 or inner component can comprise any suitable material with sufficient rigidity to withstand axial and longitudinal forces. In a particular embodiment, the shaft 506 or inner component can comprise an injection molded polymer. In another embodiment, the shaft 506 or inner component can comprise a metal or alloy formed through a machining process. In yet another embodiment, the shaft 506 or inner component can comprise a ceramic or any other suitable material. The shaft 506 or inner component can be formed from a single piece, two pieces, or several pieces joined together by welding, adhesive, fasteners, threading, or any other suitable fastening means.

In a number of embodiments, similar to the configurations shown in FIGS. 5A-5B, the sliding component 500 may be positioned or disposed between the inner component 506 and the outer component 502 to form an installed state within the assembly 5000. In an embodiment, the projection 120 may contact at least one of the inner component 506 or outer component 502 within an assembly 5000. In an embodiment, the high stiffness projection 120b may contact at least one of the inner component 506 or outer component 502 within an assembly 5000. In an embodiment, a high stiffness projection 120b may be a wave projection which contacts an outer surface of the inner component 502 to form an installed state within the assembly 5000. In an alternative embodiment, a high stiffness projection 520b may be a wave projection which contacts an inner surface of the outer component 502 to form an installed state within the assembly 5000. In some embodiments, the high stiffness projections 520b may be self-contained structures. For example, each wave structure may comprise a circumferentially extending rounded ridge with tapered shoulders at its axial ends. When the sliding component 500 is mounted on the inner or outer component 502, 506 in an assembly 5000, the tapered shoulders may act as guides to aid axial installation of the other component 502, 506.

In an embodiment, the low stiffness projection 120a may contact at least one of the inner component 506 or outer component 502 within an assembly 5000. In an embodiment, a low stiffness projection 120a may be a finger projection which contacts an outer surface of the inner component 502 to form an installed state within the assembly 5000. In an alternative embodiment, a low stiffness projection 520a may be a finger projection which contacts an inner surface of the outer component 502 to form an installed state within the assembly 5000.

In another embodiment, as shown in FIGS. 5A-5B, the bridge 516 of the low stiffness projection 520a of the sliding component 500 may make contact with the surface of a neighboring component (e.g. at least one of the inner component 506 or outer component 502). The bridge 516 may act as a radial face (e.g. defined as an area at the innermost or outmost surface of the sliding component 500 which contacts the neighboring component). In this way, the low stiffness projection 520a may be a finger projection extending radially inward or outward and provide elastically deformable contact with the neighboring component. For example, in an embodiment as shown in FIG. 5A, the low stiffness projection 520a may fill a portion of a bore 504 on a side of the innermost surface and contact the inner component 506. For example, in an embodiment as shown in FIG. 5B, the low stiffness projection 520a may fill a portion of a bore 504 on a side of the outmost surface and contact the outer component 502.

After installation of the inner component 506 or outer component 502 to contact the sliding component 500 within the assembly 5000, the angle of the bridge portion 516 of the low stiffness projection 520a can decrease or increase with respect to the sidewall 503. The post-installation angle may be dependent on the relative diameter of the inner component 506 or outer component 502 with respect to the sliding component 500. Therefore, the sliding component 500 can couple with inner components 506 or outer components 502 having diameters that may be less than the diameter of the sidewall 503 and greater than the best fit circle formed by the innermost surfaces of the low stiffness projections 520a. Further, the sliding component 500 can couple with inner components 506 or outer components 502 having diameters that may be greater than the diameter of the sidewall 503 and less than the best fit circle formed by the innermost surfaces of the low stiffness projections 520a.

Typically, the mating components of the assembly 5000 and the sliding component 500 projections 520 themselves have dimensional variability within given tolerances. Thus, the actual amount of compression of the projections 520, and hence the forces generated in the assembly 5000, can vary from assembly to assembly. However, the low stiffness projections 520a may be adapted to deform elastically, while the high stiffness projections 520b may be adapted to deform plastically. As a result, in some embodiments, the sliding component 500 provides zero clearance with low slip force for rotational or axial movement. The sliding component 500 structure may be compressible and presents the additional advantages of being operable in a variety of gap sizes (e.g., to compensate for manufacturing embodiments in the dimensions of the components) and present a smaller contact area than conventional sliding components. In combination with the sliding layer, this design provides a significant reduction in frictional forces that oppose relative motion between the components 502, 506 even when the axial or radial load is high.

In use, each high stiffness projection 520b may act as a spring and exerts a radial force against the components, thereby providing an interference fit between them. Rotation of the inner or outer component 502, 506 produces similar rotation in the other component as torque may be transmitted by the sliding component 500. Likewise, linear or axial movement of either component produces similar linear movement in the other component as linear force may be transmitted by the sliding component 500.

The high stiffness projections 120b may be arranged to project away from the sidewall 503 to provide a plurality of discrete contact surfaces with the other of the inner and outer components 502, 506. The wave structures may be configured to deform. This may include elastic deformation at the discrete contact surfaces to transmit the load force radially through the sliding component 500 between the inner and outer components 502, 506. The shape and size of each high stiffness projection 120b may be selected based on the particular application. The slip force may depend on the shape of the high stiffness projections 520b. Typically, sliding component wave structures or waves may be capable of transmitting relatively high radial forces (e.g., 200 N or more) to locate stably and provide radial stiffness between the inner and outer component 502, 506. The slip interface may be at the load transfer point between a wave projection and one of the inner and outer components 502, 506. For example, this may occur between the sliding component and the one of the inner and outer components 502, 506 that contacts the waves. The area of the footprint region may be relatively small, which, in combination with the sliding layer, reduces the frictional forces.

The high stiffness projections 520b may be carefully selected and designed for their force transfer or spring properties. The geometry of the high stiffness projections 520b may be selected to provide desired elastic and plastic deformation characteristics. The deformation characteristics may be selected not only to take account of the manufacturing tolerances of the inner and outer components 502, 506, but also to compensate for differential thermal expansion and wear that may occur between dissimilar components in operation, thus ensuring the desired performance may be achieved throughout. Further, the high stiffness projection 520b may have a different composite material than the low stiffness projection 520a. In other words, the high stiffness projection 520b may have a different sliding layer composition than the low stiffness projection 520a, or vice versa. These designs may be applicable to zero clearance sliding components 500 to ensure that the assembled components do not become loose at elevated temperatures.

In an embodiment, the high stiffness projection 520b has a stiffness, $K_{high}$, of between 0.1 N/mm to 100,000 N/mm. The stiffness, $K_{high}$, may be no greater than 100,000 N/mm, no greater than 50,000 N/mm, no greater than 10,000 N/mm, no greater than 5,000 N/mm, no greater than 1,000 N/mm, no greater than 500 N/mm, or no greater than 100 N/mm. The stiffness, $K_{high}$, may be at least 500 N/mm, at least 1,000 N/mm, at least 5,000 N/mm, at least 10,000 N/mm, at least 25,000 N/mm, at least 50,000 N/mm, or at least 100,000 N/mm. The stiffness, $K_{high}$, may be within any of the ranges recited above.

In an embodiment, the high stiffness projection 520b contacts a neighboring component along at least 1% of its radial surface area, such as at least 5% of its radial surface area, such as at least 10% of its radial surface area, such as at least 25% of its radial surface area, such as at least 50% of its radial surface area, such as at least 75%, of its radial surface area, or such as at least 95% of its radial surface area.

In use, each low stiffness projection 520a may act as a deflected slider and exerts a radial force against the components, thereby providing an interference fit between them. Rotation of the inner or outer component 502, 506 produces similar rotation in the other component as torque may be transmitted by the sliding component 500. Likewise, linear or axial movement of either component produces similar linear movement in the other component as linear force may be transmitted by the sliding component 500.

The low stiffness projection 520a may be arranged to project away from the sidewall 503 to provide a plurality of discrete contact surfaces (e.g. radial faces) with the other of the inner and outer components 502, 506. The finger projections may be configured to deform. This may include plastic deformation at the discrete contact surfaces to transmit the load force radially through the sliding component 500 between the inner and outer components 502, 506. The shape and size of each low stiffness projection 520a may be selected based on the particular application. The slip force may depend on the shape of the low stiffness projections 120a. Typically, sliding component wave structures or waves may be capable of transmitting relatively high radial forces (e.g., 200 N or more) to locate stably and provide radial stiffness between the inner and outer component 502, 506. The slip interface may be at the load transfer point between a wave projection and one of the inner and outer components 502, 506. For example, this may occur between the sliding component and the one of the inner and outer components 502, 506 that contacts the radial faces of the finger projections. The area of the footprint region may be relatively small, which, in combination with the sliding layer, reduces the frictional forces.

The low stiffness projection 520a may be carefully selected and designed for their force transfer or spring properties. The geometry of the low stiffness projection 520a may be selected to provide desired plastic deformation characteristics. The deformation characteristics may be selected not only to take account of the manufacturing tolerances of the inner and outer components 502, 506, but also to compensate for differential thermal expansion and wear that may occur between dissimilar components in operation, thus ensuring the desired performance may be achieved throughout. Further, the low stiffness projection 520a may have a different composite material than the high stiffness projection 520b as described above. These designs may be applicable to zero clearance sliding components 500 to ensure that the assembled components do not become loose at elevated temperatures.

In an embodiment, the low stiffness projection 520a has a stiffness, $K_{low}$, of between 0.1 N/mm to 100,000 N/mm. The stiffness, $K_{low}$, may be no greater than 100,000 N/mm, no greater than 50,000 N/mm, no greater than 10,000 N/mm, no greater than 5,000 N/mm, no greater than 1,000 N/mm, no greater than 500 N/mm, or no greater than 100 N/mm. The stiffness, $K_{low}$, may be at least 500 N/mm, at least 1,000 N/mm, at least 5,000 N/mm, at least 10,000 N/mm, at least 25,000 N/mm, at least 50,000 N/mm, or at least 100,000 N/mm. The stiffness, $K_{low}$, may be within any of the ranges recited above.

In an embodiment, the ratio of stiffnesses may be $K_{high}$>1.5 $K_{low}$, such as $K_{high}$>2 $K_{low}$, such as $K_{high}$>3 $K_{low}$, such as $K_{high}$>5 $K_{low}$, or such as $K_{high}$>10 $K_{low}$.

In an embodiment, the low stiffness projection 520a contacts a neighboring component along at least 1% of its radial surface area, such as at least 5% of its radial surface area, such as at least 10% of its radial surface area, such as at least 25% of its radial surface area, such as at least 50% of its radial surface area, such as at least 75%, of its radial surface area, or such as at least 95% of its radial surface area.

The sliding component 500 may be secured by frictional engagement of the band on one of the components 502, 506. In split ring or panel embodiments, the split ring or panel 500 may be resilient so as to grip one component 506 (e.g., a shaft) that may be larger than its diameter, or expand outward against an outer component 502 (e.g., a bore in a housing) that may be smaller than its diameter. It may be desirable to permit relative movement between the inner and outer components 502, 506 in only one sense (e.g., rotational or axial). In this case, the sliding component 500 may be mechanically constrained with respect to one of the components to prevent relative movement at the slip interface in the undesired sense.

It is known to provide sliding components 500 that allow slipping between components 502, 506 in exceptional circumstances. For example, if relatively high forces (e.g., rotational or linear) are applied to one or both of the inner and outer components 502, 506 such that the resultant force between the components may be above a threshold value. In conventional sliding components that threshold value may be high and may be based on an expected value based on the radial load force experienced by the ring.

According to still another aspect, there may be provided a method including providing an inner component 506 and an outer component 502. The method may further include providing a sliding component 500 between the inner component 506 and the outer component 502. The sliding component 500 may include a sidewall 503, and at least one low stiffness projection 520a comprising a radial face 516 at an innermost or outermost surface and capable of elastic deformation, and at least one high stiffness projection 520b capable of plastic deformation. The method may further include contacting the radial face 516 of the low stiffness projection 520a to at least one of the inner component 506 or the outer component 502.

In an embodiment, the assembly 5000 can be installed or assembled by an assembly force of at least 10 N in a longitudinal direction relative to the inner component 506 or outer component 502, such as at least 25 N, at least 50 N, at least 100 N, at least 250 N, or at least 500 N. In a further embodiment, the assembly 5000 can be installed or assembled by an assembly force of no greater than 10000 N in a longitudinal direction relative to the shaft 4 or housing 8, such as no greater than 5000 N, no greater than 2500 N, no greater than 1000 N, no greater than 500 N, or no greater than 250 N. In a number of embodiments, the projection 520 of the sliding component 500 may have a snap-in function that can reduce assembly force by a factor of 5 to 10.

Assemblies for using the sliding component according to embodiments herein may include a hinge assembly, particularly hinge assemblies within vehicles. Particular hinge assemblies may be car door hinge assemblies, liftgate hinge assemblies, solar panel array hinge assemblies, boom hinge assemblies, motor hinge assemblies, boom hinge assemblies, automotive interior hinges, or may be another type.

Use of the sliding component within an assembly according to embodiments herein may provide a noise free or substantially noise free assembly. Further, additional machining or additional component parts within the assembly may also be eliminated through use of the sliding component according to embodiments herein. As a result, cost of componentry, assembly weight, and assembly time and force may be lessened. This may increase the lifetime of the assembly and its components. Further, the use of projections with high and low stiffness together (along with radial face contact from the low stiffness projection) may create desirable stiffness characteristics tailored to assemblies for specific applications and environments. This may allow relatively constant and low sliding or torque values with minimal variation while providing sufficient support to avoid excessive deformation in case of overload within hinge applications.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1: A sliding component, comprising: a sidewall comprising at least one low stiffness projection capable of elastic deformation, and at least one high stiffness projection capable of plastic deformation, wherein the low stiffness projection comprises a radial face at an innermost or outermost surface adapted to contact a neighboring component.

Embodiment 2: An assembly, comprising: an outer component including a bore within the outer component; an inner component disposed within the bore; and a sliding component mounted between the inner component and the outer component, the sliding component comprising: a sidewall comprising at least one low stiffness projection capable of elastic deformation, and at least one high stiffness projection capable of plastic deformation, wherein the low stiffness projection comprises a radial face at an innermost or outermost surface contacting at least one of the outer component or the inner component.

Embodiment 3: A method, comprising: providing an inner component and an outer component; positioning a sliding component between the inner component and the outer component, the sliding component comprising: a sidewall comprising at least one low stiffness projection comprising a radial face at an innermost or outermost surface and capable of elastic deformation, and at least one high stiffness projection capable of plastic deformation; and contacting the radial face of the low stiffness projection to at least one of the inner component or the outer component.

Embodiment 4: The sliding component, assembly, or method of any of embodiments 1, 2, or 3, wherein the low stiffness projection comprises a finger projection.

Embodiment 5: The sliding component, assembly, or method of any of embodiments 1, 2, or 3, wherein the high stiffness projection comprises a wave projection.

Embodiment 6: The sliding component, assembly, or method of any of embodiments 1, 2, or 3, wherein the sidewall further comprises cut-out portions.

Embodiment 7: The sliding component, assembly, or method of embodiment 4, wherein each finger projection extends radially outward from the sidewall.

Embodiment 8: The sliding component, assembly, or method of embodiment 4, wherein each finger projection extends radially inward from the sidewall.

Embodiment 9: The sliding component, assembly, or method of embodiment 5, wherein each wave projection extends radially outward from the sidewall.

Embodiment 10: The sliding component, assembly, or method of embodiment 5, wherein each wave projection extends radially inward from the sidewall.

Embodiment 11: The sliding component, assembly, or method of any of embodiments 1, 2, or 3, wherein the low stiffness projection comprises a plurality of low stiffness projections.

Embodiment 12: The sliding component, assembly, or method of any of embodiments 1, 2, or 3, wherein the high stiffness projection comprises a plurality of high stiffness projections.

Embodiment 13: The sliding component, assembly, or method of embodiment 12, wherein the high stiffness projections and low stiffness projections are ordered alternatively around the sidewall.

Embodiment 14: The sliding component, assembly, or method of embodiment 12, wherein the high stiffness projections and low stiffness projections are ordered concurrently around the sidewall.

Embodiment 15: The sliding component, assembly, or method of any of embodiments 1, 2, or 3, wherein the high stiffness projection has a stiffness, $K_{high}$.

Embodiment 16: The sliding component, assembly, or method of any of embodiments 1, 2, or 3, wherein the low stiffness projection has a stiffness, $K_{low}$.

Embodiment 17: The sliding component, assembly, or method of any of embodiments 1, 2, or 3, wherein $K_{high} > 1.5\ K_{low}$.

Embodiment 18: The sliding component, assembly, or method of any of embodiments 1, 2, or 3, wherein the high stiffness projection contacts a neighboring component along at least 1% of its radial surface area.

Embodiment 19: The sliding component, assembly, or method of any of embodiments 1, 2, or 3, wherein the low stiffness projection contacts a neighboring component along at least 1% of its radial surface area.

Embodiment 20: The assembly of embodiment 2, wherein the sliding component has a torque value of 0.1 Nmm to 50 Nm under a rotation angle of 0°-360°.

Embodiment 21: The sliding component, assembly, or method of any of embodiments 1, 2, or 3, wherein the sliding component comprises a planar panel.

Embodiment 22: The sliding component, assembly, or method of any of embodiments 1, 2, or 3, wherein the sliding component comprises an annular ring.

Embodiment 23: The sliding component, assembly, or method of any of embodiments 1, 2, or 3, wherein the sliding component comprises a composite material comprising a substrate and a sliding layer.

Embodiment 24: The sliding component, assembly, or method of embodiment 23, wherein the substrate comprises a metal.

Embodiment 25: The sliding component, assembly, or method of embodiment 23, wherein the sliding layer comprises a polymer.

This written description uses examples, including the best mode, and also to enable those of ordinary skill in the art to make and use the invention. The patentable scope of the invention is defined by the embodiments, and may include other examples that occur to those skilled in the art. Such other examples are intended to be within the scope of the embodiments if they have structural elements that do not differ from the literal language of the embodiments, or if they include equivalent structural elements with insubstantial differences from the literal languages of the embodiments. For example, embodiments may relate to rotational devices such as an electric motor, such as a windshield wiper motor), or axial sliding applications, such as a steering column adjustment mechanism.

While embodiments have been shown or described in only some of forms, it should be apparent to those skilled in the art that they are not so limited, but are susceptible to various changes without departing from the scope of the invention.

What is claimed is:

1. A sliding component, comprising:
a sidewall comprising a substrate having at least one low stiffness projection capable of elastic deformation, and at least one high stiffness projection capable of plastic deformation, wherein the low stiffness projection comprises a radial face at an innermost or outermost surface adapted to contact a neighboring component, and wherein the at least one low stiffness projection comprises a finger projection or a rib projection, wherein the at least one high stiffness projection comprises a wave projection, and wherein the at least one high stiffness projection and the at least one low stiffness projection are ordered alternatively around the sidewall, wherein the high stiffness projection has a stiffness, $K_{high}$, wherein the low stiffness projection has a stiffness, $K_{low}$, and wherein $K_{high} > 1.5\ K_{low}$, wherein $K_{high}$ is at least 0.1 N/mm and no greater than 100,000 N/mm, wherein $K_{low}$ is at least 0.1 N/mm and no greater than 100,000 N/mm, and wherein the substrate has a thickness, Ts, of between about 10 microns to about 1500 microns.

2. The sliding component of claim 1, wherein the sidewall further comprises cut-out portions.

3. The sliding component of claim 1, wherein each finger projection or rib projection extends radially outward from the sidewall.

4. The sliding component of claim 1, wherein each finger projection or rib projection extends radially inward from the sidewall.

5. The sliding component of claim 1, wherein each wave projection extends radially outward from the sidewall.

6. The sliding component of claim 1, wherein each wave projection extends radially inward from the sidewall.

7. The sliding component of claim 1, wherein the low stiffness projection comprises a plurality of low stiffness projections.

8. The sliding component of claim 7, wherein the plurality of low stiffness projections each project away from the sidewall to provide a plurality of radial faces with the inner and outer components.

9. The sliding component of claim 1, wherein the high stiffness projection comprises a plurality of high stiffness projections.

10. The sliding component of claim 9, wherein at least two high stiffness projections are ordered consecutively around the sidewall.

11. The sliding component of claim 1, wherein the sliding component is an annular ring.

12. The sliding component of claim 1, wherein the high stiffness projection comprises an indent in the sidewall.

13. The sliding component of claim 1, wherein the finger projection is coupled to the sidewall along a first side thereof while being continuously disconnected from the sidewall along the remaining sides.

14. The sliding component of claim 1, wherein the rib projection is coupled to the sidewall along a first side and a third side thereof while being continuously disconnected from the sidewall along the remaining sides.

15. The sliding component of claim 1, wherein $K_{high}$ is at least 500 N/mm and no greater than 100,000 N/mm, wherein $K_{low}$ is at least 0.1 N/mm and no greater than 50,000 N/mm.

16. An assembly, comprising:
an outer component including a bore within the outer component;
an inner component disposed within the bore; and
a sliding component mounted between the inner component and the outer component, the sliding component comprising:
a sidewall comprising a substrate having at least one low stiffness projection capable of elastic deformation, and at least one high stiffness projection capable of plastic deformation, wherein the low stiffness projection comprises a radial face at an innermost or outermost surface contacting at least one of the outer component or the inner component, and wherein the at least one low stiffness projection comprises a finger projection or rib projection, wherein the at least one high stiffness projection comprises a wave projection, and wherein the at least one high stiffness projection and the at least one low stiffness projection are ordered alternatively around the sidewall, wherein the high stiffness projection has a stiffness, $K_{high}$, wherein the low stiffness projection has a stiffness, $K_{low}$, and wherein $K_{high} > 1.5 \ K_{low}$, wherein $K_{high}$ is at least 0.1 N/mm and no greater than 100,000 N/mm, wherein $K_{low}$ is at least 0.1 N/mm and no greater than 100,000 N/mm, and wherein the substrate has a thickness, Ts, of between about 10 microns to about 1500 microns.

17. The assembly of claim 16, wherein the high stiffness projection contacts a neighboring component along at least 1% of its radial surface area.

18. The assembly of claim 16, wherein the low stiffness projection contacts a neighboring component along at least 1% of its radial surface area.

19. The assembly of claim 16, wherein the sliding component has a torque value of 0.1 N mm to 50 Nm under a rotation angle of 0°-360.

20. A method, comprising:
providing an inner component and an outer component;
positioning a sliding component between the inner component and the outer component, the sliding component comprising:
a sidewall comprising a substrate having at least one low stiffness projection comprising a radial face at an innermost or outermost surface and capable of elastic deformation, and at least one high stiffness projection capable of plastic deformation; and
contacting the radial face of the low stiffness projection to at least one of the inner component or the outer component, and wherein the at least one low stiffness projection comprises a finger projection or a rib projection, wherein the at least one high stiffness projection comprises a wave projection, and wherein the at least one high stiffness projection and the at least one low stiffness projection are ordered alternatively around the sidewall, wherein the high stiffness projection has a stiffness, $K_{high}$, wherein the low stiffness projection has a stiffness, $K_{low}$, and wherein $K_{high} > 1.5 \ K_{low}$, wherein $K_{high}$ is at least 0.1 N/mm and no greater than 100,000 N/mm, wherein $K_{low}$ is at least 0.1 N/mm and no greater than 100,000 N/mm, and wherein the substrate has a thickness, Ts, of between about 10 microns to about 1500 microns.

* * * * *